US006850638B1

(12) United States Patent
Lounsbery

(10) Patent No.: US 6,850,638 B1
(45) Date of Patent: Feb. 1, 2005

(54) SYSTEM FOR NAMING FACES AND VERTICES IN AN ADAPTIVE HIERARCHICAL SUBDIVISION SURFACE

(75) Inventor: Michael Lounsbery, Bellevue, WA (US)

(73) Assignee: Alias Systems Corp., Toronto (CA)

( * ) Notice: Subject to any disclaimer, the term of this patent is extended or adjusted under 35 U.S.C. 154(b) by 0 days.

(21) Appl. No.: 09/515,517

(22) Filed: Feb. 29, 2000

(51) Int. Cl.⁷ .............................................. G06T 17/30

(52) U.S. Cl. ...................... 382/154; 345/420

(58) Field of Search .................. 382/154; 345/419–428

(56) References Cited

U.S. PATENT DOCUMENTS

| | | | |
|---|---|---|---|
| 6,037,949 A | 3/2000 | DeRose et al. ............. 345/430 |
| 6,144,773 A | * 11/2000 | Kolarov et al. ............. 382/240 |
| 6,307,555 B1 | 10/2001 | Lee ............................ 345/423 |
| 6,389,154 B1 | 5/2002 | Stam .......................... 382/108 |
| 6,553,337 B1 | 4/2003 | Lounsbery ................... 703/2 |

OTHER PUBLICATIONS

Andrew Certain et al., Interactive Multiresolution Surface Viewing, ACM publication, 1996, pp. 91–98.*
H. Tsuboi et al., Triangular Mesh Generation using Knowledge Base for Three-Dimensional Boundary Element Method, IEEE publication, 1990, pp. 799–802.*
Hanan Samet, "Applications of Spatial Data Structures: Computer Graphics, Image Processing, and GIS", University of Maryland, pp. 1–41.
Hanan Samet, The Design and Analysis of Spatial Data Structures, University of Maryland, p1.

* cited by examiner

Primary Examiner—Brian Werner
(74) Attorney, Agent, or Firm—Staas & Halsey LLP

(57) ABSTRACT

The present invention assigns a unique name or identifier to a face of a subdivision surface that can be stored and manipulated as a fixed length integer. The face name representation includes a base face index field identifying the base mesh face from which the face being named is derived, a vertex index field identifying the base mesh vertex from which the face is derived, a level field identifying the level of the subdivision face and a path field that identifies the path to the face. The vertices and edges of each face can also be assigned unique names.

15 Claims, 10 Drawing Sheets

SYSTEM FOR NAMING FACES AND VERTICES IN AN ADAPTIVE HIERARCHICAL SUBDIVISION SURFACE

CROSS REFERENCE TO RELATED APPLICATIONS

This application is related to U.S. Pat. No. 6,389,154 entitled Surface Evaluation having Ser. No. 09/16,553 by Stam, filed Jul. 15, 1998, U.S. Pat. No. 6,307,555 entitled Boolean Operators For Subdivision Surfaces having Ser. No. 09/164,089 by Lee, filed Sep. 30, 1998, and U.S. Pat. No. 6,553,337 entitled Parameterization Of Subdivision Surfaces having Ser. No. 09/219,613 by Lounsbery, filed Dec. 23, 1998, all incorporated by reference herein.

BACKGROUND OF THE INVENTION

1. Field of the Invention

The present invention is directed to a system that provides a name for faces and vertices in an hierarchical subdivision surface and, more particularly, provides unique names from which each face of a surface, each vertex of a surface and each edge of a surface can be unambiguously identified.

2. Description of the Related Art

Many computer applications model surfaces and objects. Since computers have a limited storage capacity, an object cannot be modeled with an infinite number of coordinate points. To overcome this problem, methods are used to approximate the object surface with surface primitives. One method uses a polygonal mesh comprising a set of polygonally bounded faces. Representing objects with curved surfaces using a polygonal mesh requires approximating the surface with a number of faces or polygons. The error between the model and the real object can be reduced by making the polygons arbitrarily small. When an object is represented as a set of such polygonal faces, and the representation is loaded into or out from the modeling application, the faces, as well as the vertices and edges need to be identified. In conventional systems, often the same face or vertex is provided with a different identity or identifier each time the representation is loaded into the application. Additionally, when the representation is provided to a different but compatible modeling application, a face or vertex can receive another identity. This changing of the identity of faces and vertices results in inefficient utilization of resources. Inconsistencies between representations make it difficult or impossible to identify the "same" face or vertex in representations that are copies of each other. Such inconsistency is a serious problem in modeling systems.

When a model of an object needs to be made more accurate over all or in a particular area, the modeling application divides larger polygon faces into smaller faces and thereby adapts to a higher resolution representation. When this occurs, the system needs to create face and vertex identities that are not duplicates of other vertices and faces that already exist in the representation, and theses new names need to persist when the representation is loaded and used at a later time such as for input/output.

What is needed is a system that defines a unique name for every face at any level in an adaptive hierarchical subdivision surface, such that the name persists across different executions of the code, so that it can be used for I/O. What is also needed are unique names for the vertices and edges of the polygonal faces of the mesh.

SUMMARY OF THE INVENTION

It is an object of the present invention to provide a system that uniquely names or identifies every face, vertex and edge in a hierarchical subdivision surface.

It is another object of the present invention to provide names that persist across executions of an application that uses a polygonal face representation of an object.

It is also an object of the present invention to improve the efficiency of systems that represent objects with a polygonal mesh in a hierarchy.

The above objects can be attained by a system that assigns a unique name or identifier to a face that includes information identifying the base mesh face from which the face being named is derived, identifying the base mesh vertex from which the face is derived and identifies the path to the face. When the face name is represented as a fixed length number, the name can include identity of the subdivision level of the face. In association with the face name, the vertices and edges of the face can be assigned unique names.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
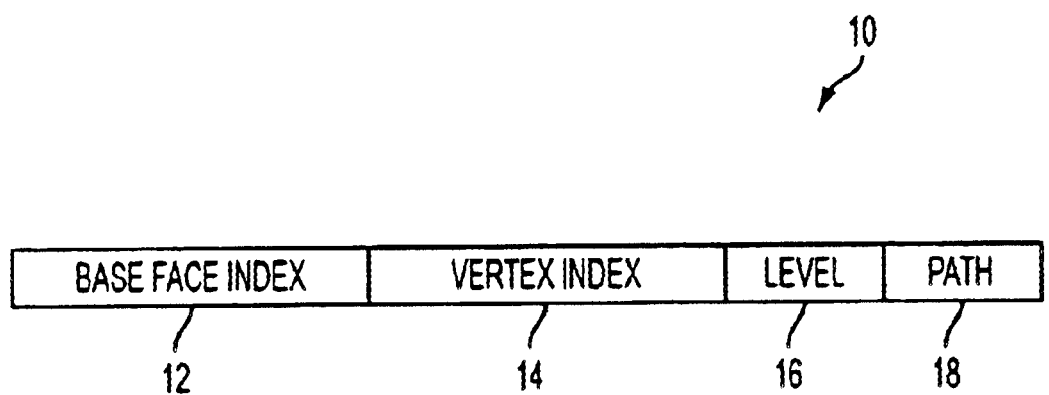
FIG. 1 depicts the name of a face according to the present invention.

The present invention provides a unique naming scheme for naming faces, vertices and edges of adaptive hierarchical subdivision surfaces. This naming scheme produces a name that can be embodied in a field divided data structure such as illustrated in FIG. 1. A name 10 in accordance with the present invention includes a base face index 12 (or name) preferable an integer, a vertex index 14 (or name) preferable an integer, a mesh level 16 preferable an integer and a path 18 that identifies how to reach the face or vertex within the mesh starting from the base mesh (level 0). The path is preferably a stack of integers (bit pairs) in the range 0 . . . 3, with coarsest at the top of the stack. The base face index 12 identifies the polygon of the base mesh in which the target face resides. The vertex index 14 is an index to the level one face within the base face in which the target face resides. The vertex index requires a predetermined ordering, such as, counter-clockwise, among the adjacent faces and the vertex name or index is the name of the lowest-order adjacent face, concatenated to the ordering of the vertex around that face. The mesh level 16 is the subdivision level of the target face within the hierarchical subdivision surface. The face name with the concatenated fields 12, 14, 16 and 18 noted above is preferably converted into a 64 bit integer for ease of handling and storage. When the integer is converted into a binary number, the field divided data structure noted above, can be used to access the different variables of the face name.

Figure 2:
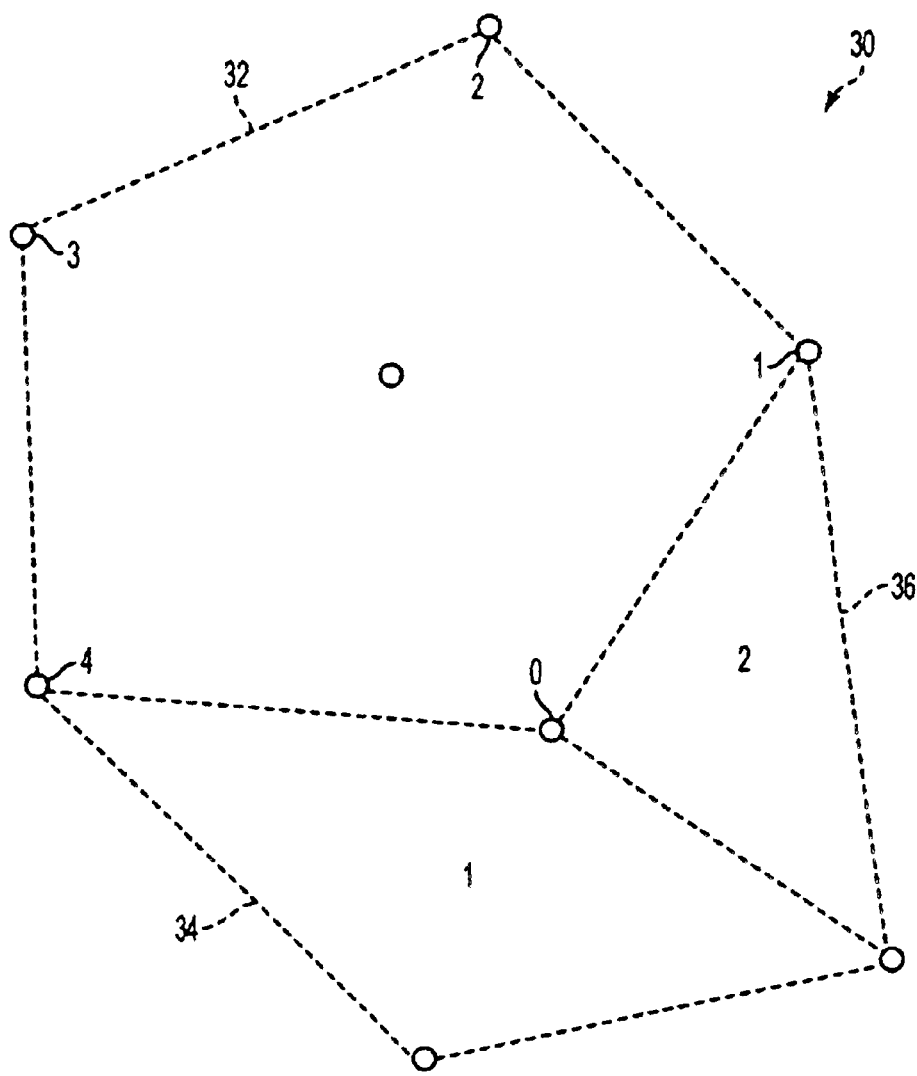
FIG. 2 illustrates a base mesh, base face numbering and a vertex numbering of a part of the base mesh.
Figure 3:
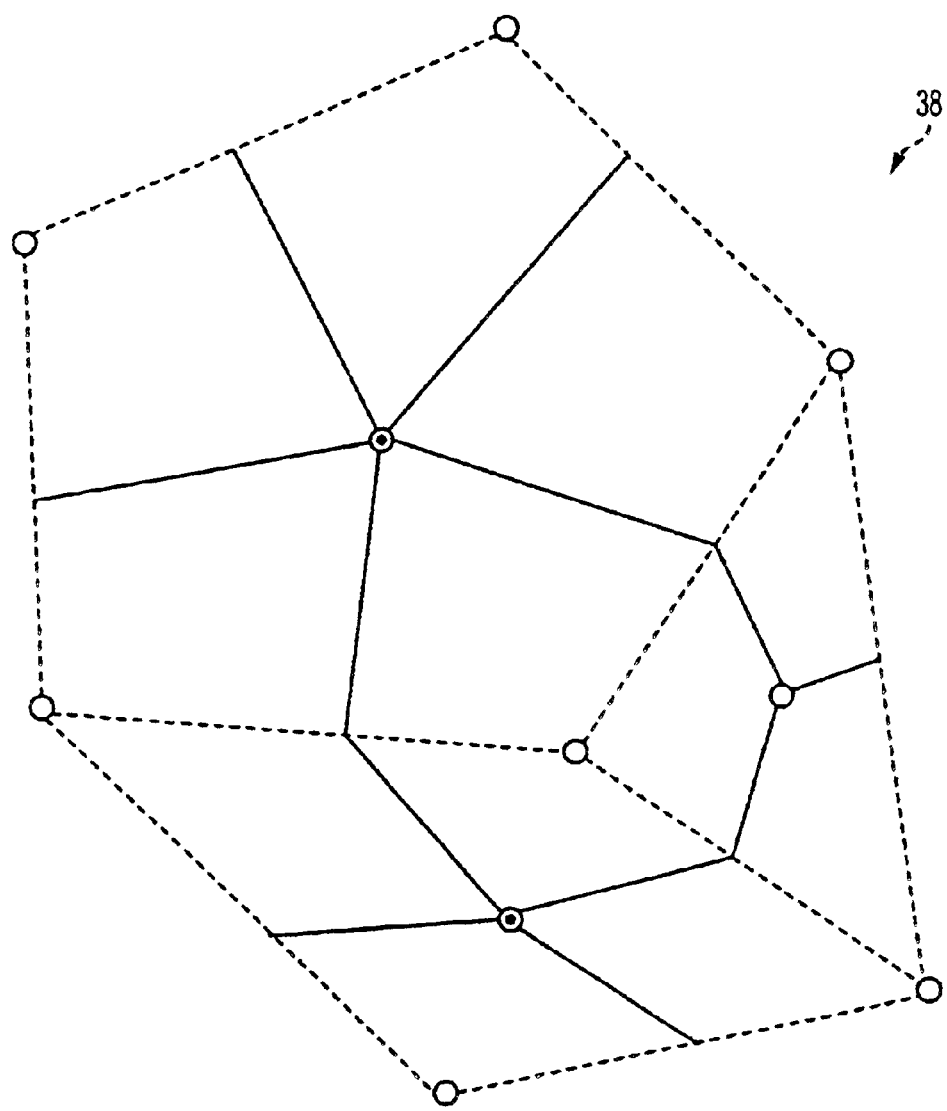
FIG. 3 illustrates a first level subdivisions of the base mesh of FIG. 2.
Figure 4:
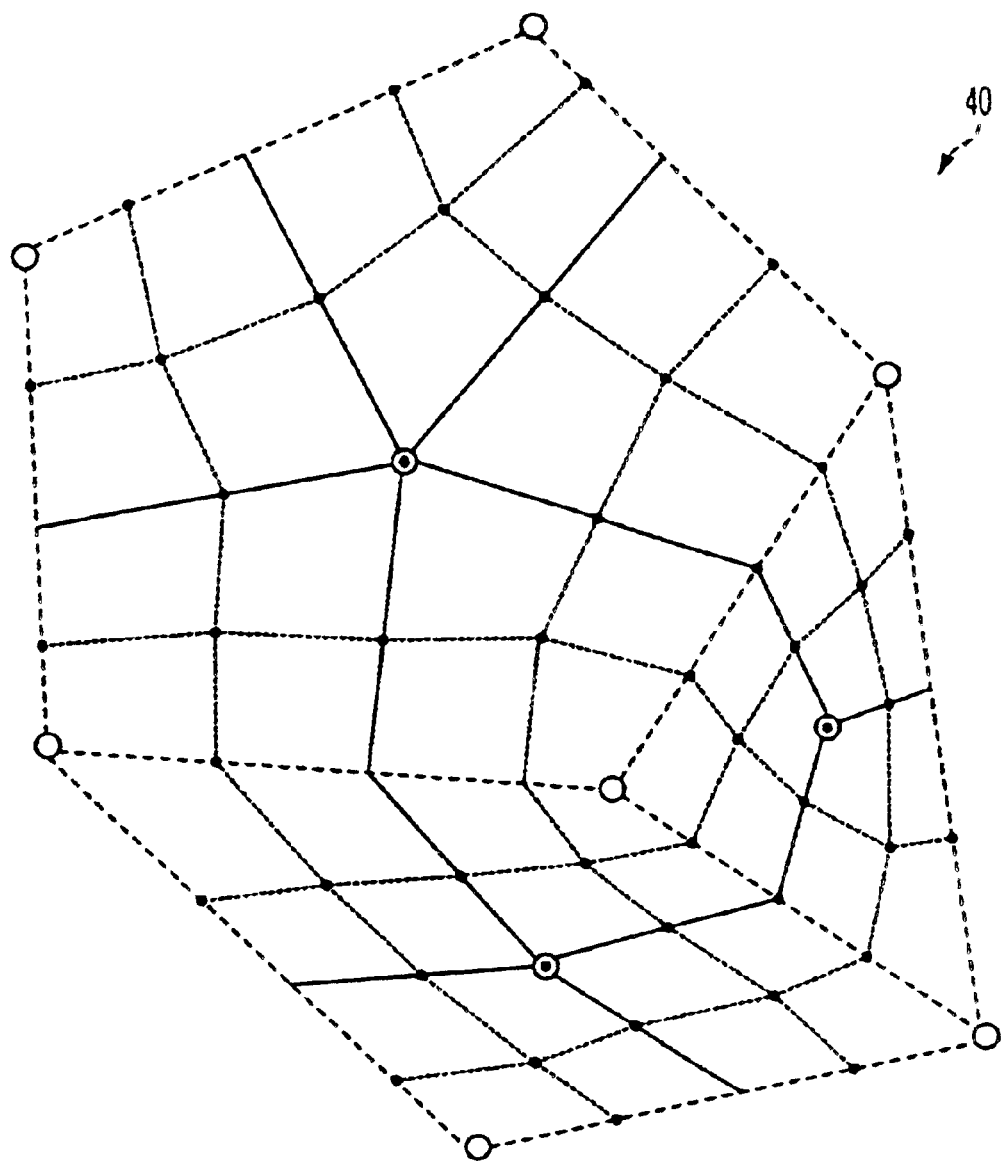
FIG. 4 depicts a second level subdivision of the base mesh of FIG. 2.
Figure 6:
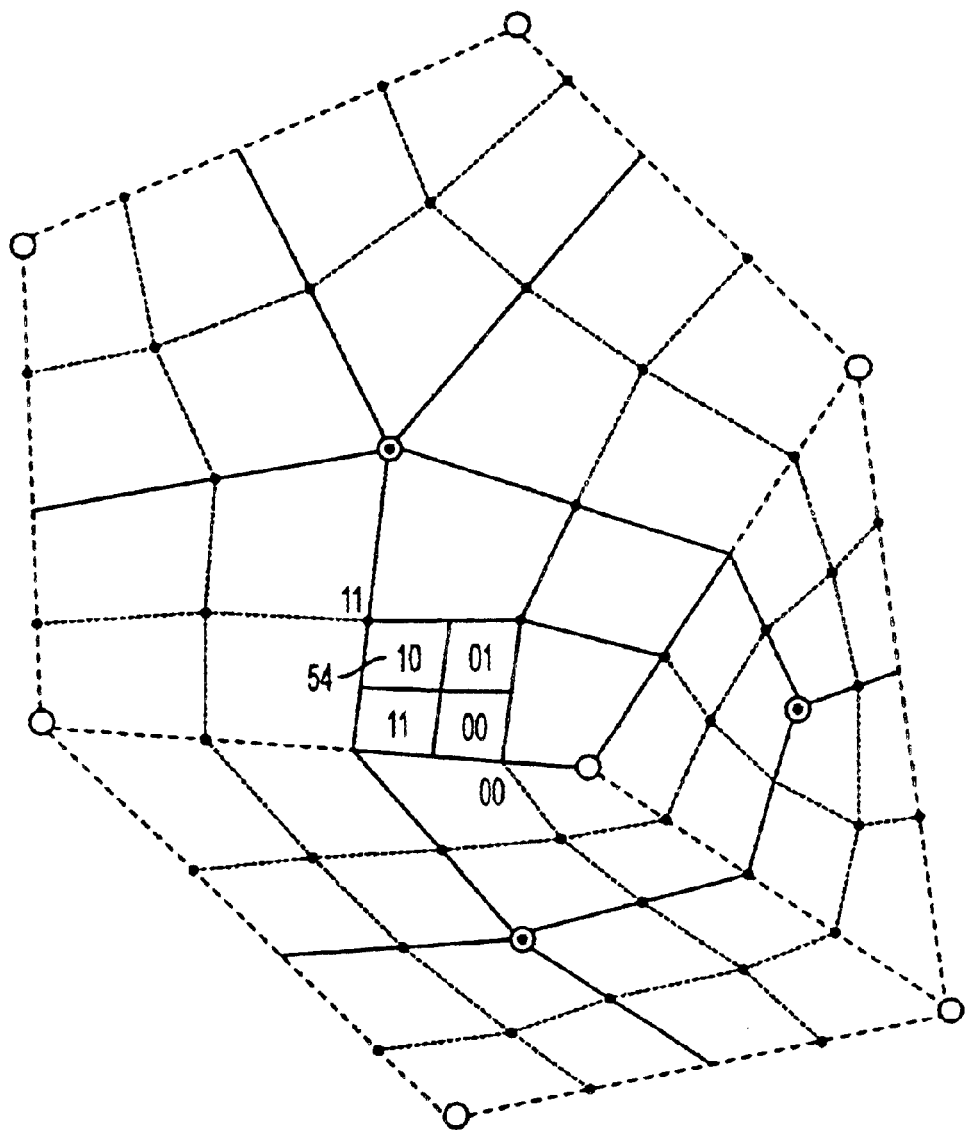
FIG. 6 depicts a third level subdivision along with face numbering and origin designation.
Figure 7:
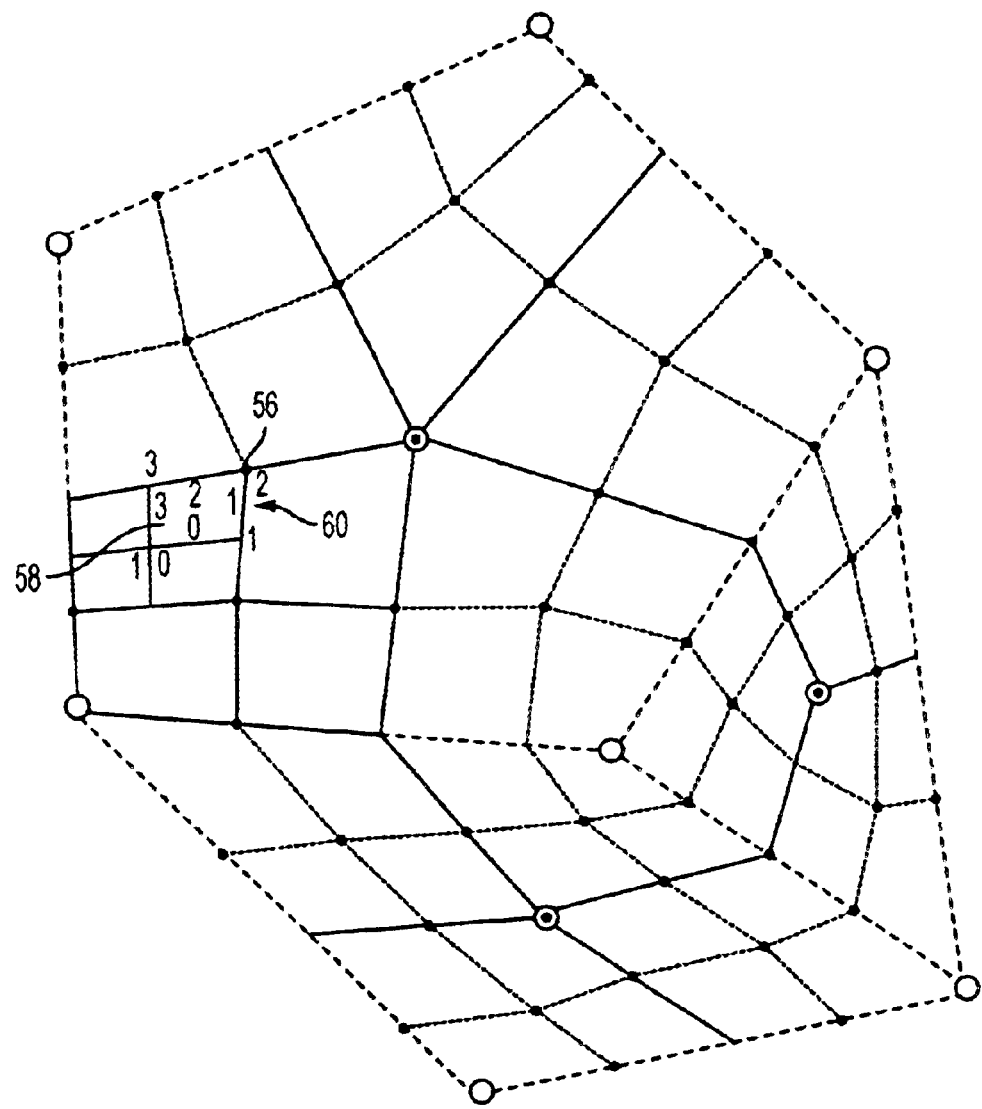
FIG. 7 illustrates vertex numbers or names and edge numbers or names.

Polygonal meshes can be used to describe the surface of an object being represented in a computer. The accuracy of the surface representation depends of the number of polygons of the mesh representing the surface. The finer the mesh, the more accurate the representation. As a result, graphical representations of surfaces are divided into polygons depending on the accuracy of the surface needed. An arbitrary collection of polygons can be subdivided into finer and finer meshes as needed. FIG. 2 depicts a zero level mesh 30 including three polygons, one a five sided polygon 32, one a four sided polygon 34 and a three sided polygon 36. FIGS. 2–4 depict the subdivision of the zero level polygonal mesh 30 into a level one mesh 38 (FIG. 3) and a level two mesh 40 (FIG. 4). FIGS. 6 and 7 illustrate a subdivision of the mesh down to level three for a portion of the mesh. Each of the subdivisions is obtained by determining the midpoints of each edge and the midpoints of each face, and connecting the edge midpoints to the face midpoints to make what are called "quads" which is a technique called Catmul-Clark subdivision. At the point that the subdivision goes from level zero to level one, the entire surface is represented by quads. Each of the quads includes several graphical elements: a face, several multidimensional vertices and four edges. These elements can be identified or named in a number of different ways which allows the representation to be stored, retrieved and used by graphical application programs. For example, it is possible to provide a pointer for each element and create a list of pointers. As another example, the elements can be arbitrarily indexed and listed. However, these methods are arbitrary and when the surface is edited, generally the listing needs to be completely re-created from the beginning. When the representation is stored, the mesh must be rebuilt in exactly the same order. The present invention provides a naming scheme that is independent of such arbitrary requirements.

The present invention assumes that a base polygonal mesh or base mesh is provided that includes a base face name or index for each face and a vertex ordering. FIG. 2 shows base face indices of 0, 1 and 2 for the 5, 4 and 3 sided polygons, respectively, and a vertex ordering for face 0 of 0, 1, 2, 3 and 4 in a counter clockwise direction, which is the preferred ordering direction for vertices and edges as discussed herein.

Figure 5:
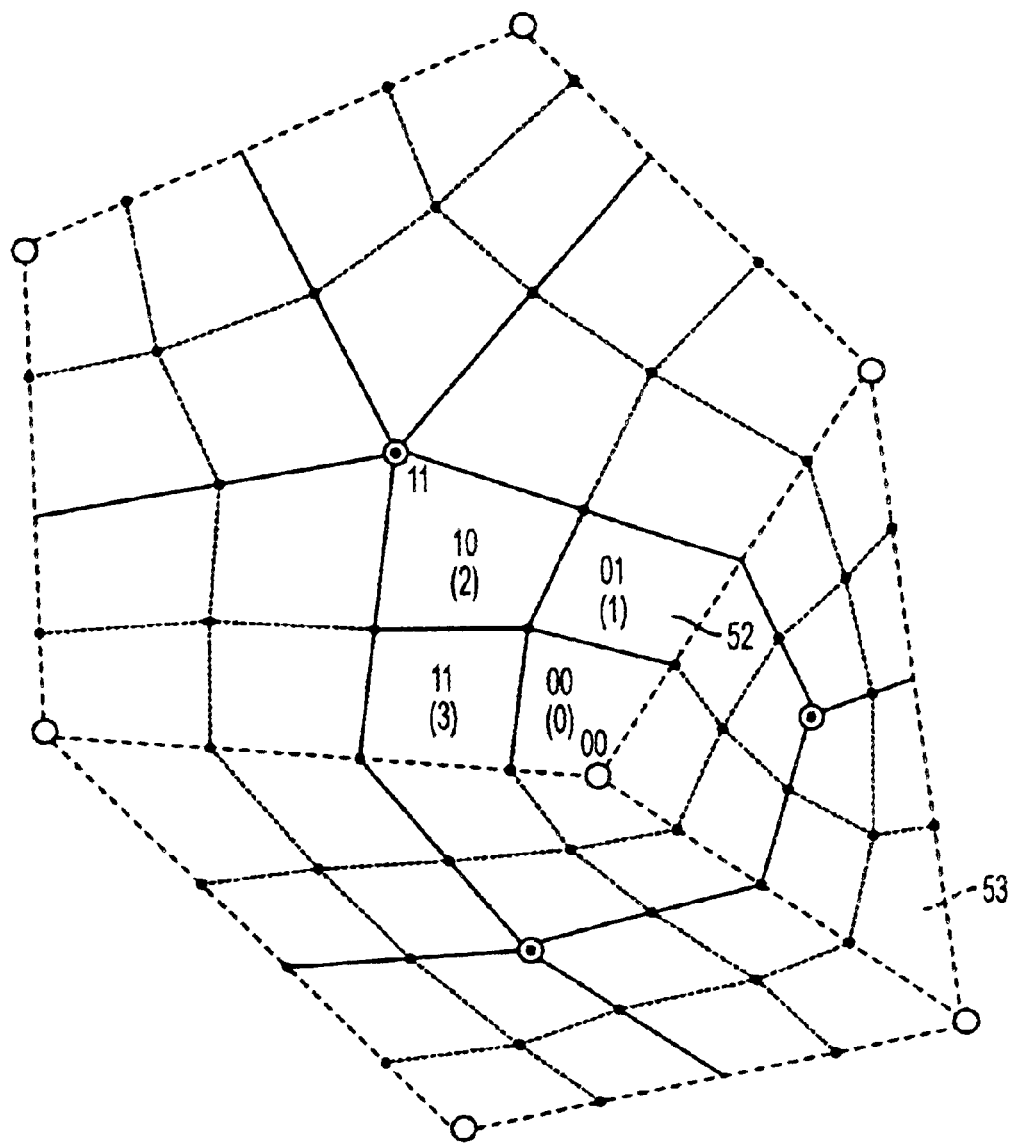
FIG. 5 depicts face numbering or naming and origin designation.

In building a face name, the base face name is the base face name of the face in which the target face resides. In the example of FIG. 5, using the base face names and vertex ordering shown in FIG. 2, the face 52 has a base face name of 0. In contrast, the face 53 has a base face name or index of 2.

The vertex index is the index of the level one face or the level zero base vertex of the face as seen from the base mesh face. That is, the ordering of that face associated with the vertex, as indexed from the base mesh FACE that the level 1 face is subdivided from. For face 52, the vertex index or index to the level one face within the base mesh face is 0.

The path is defined by quad tree hierarchical indexing conventions. To define the path, an origin and the axes of the face need to be defined for the face. The origin is the closest vertex of the face to the vertex of the vertex index of the target face and the farthest vertex is the opposite vertex of the face. The base vertex is the origin "00" and the farthest vertex is the "11" vertex as shown in FIG. 5. The subdivision faces are then provided a binary number assigned counter clockwise, such that the path to face 52 is binary 01 or integer 1. As another example, using the numbering and ordering of FIGS. 2 and 5, the face 54 of FIG. 6 at level 3, would have an origin "00", as shown, which is determined as the vertex closest to the index vertex and a path of binary 11,10 or integer 3,2.

The name is stored as fixed precision integer rather than as a series of binary pairs. This can cause some ambiguity in the interpretation of the path specified by the integer. For example, if the path is being used in a system in which the path field of the integer is as eight bits, the path 2 could be interpreted as 00,00,00,01, such that the face is a level five face. In a system in which the path field is represented by 12 bits, the face would be a level seven face. To remove this ambiguity, the system indicates, in the face name, the level of the face for which a path is being provided, thereby indicating the size of the field being used for the path. In the example of FIG. 6, the level is 3.

As a result, the path name for the face 54 in FIG. 6, would be 0,0,3,3,2.

The vertices of a face, as previously noted, are numbered starting with the origin (the vertex closest to the base face vertex) and numbered in a counter clockwise direction. In the example of FIG. 7, the vertex 56 of face 58 has a vertex number of 2. Edges are numbered in a similar manner starting with the origin and counting clockwise. In the example of FIG. 7, the edge 60 is edge number 1.

Figure 8:
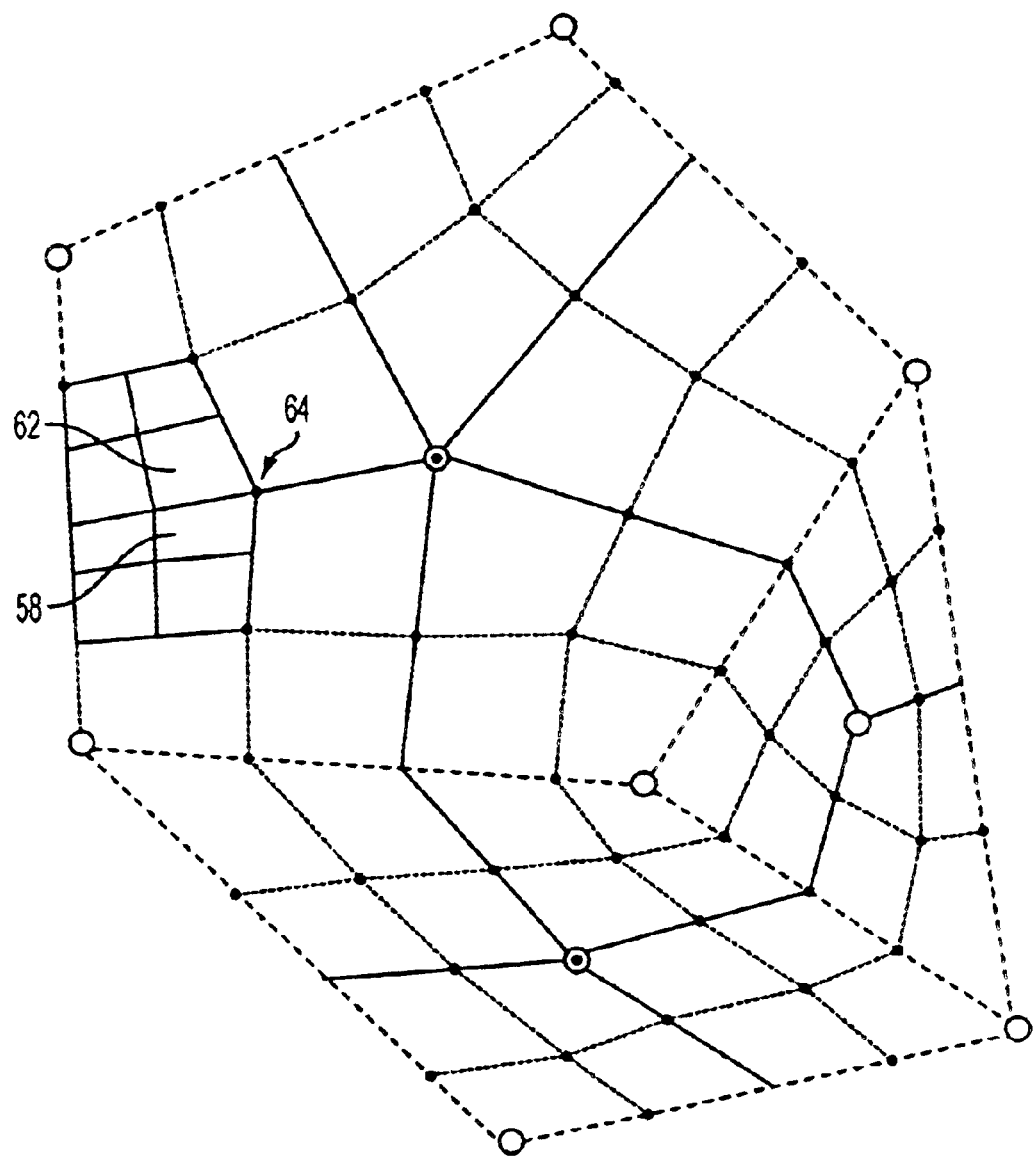
FIG. 8 illustrates a vertex shared between faces.

FIG. 8 depicts faces 58 and 62 and the face names of theses two faces will be provided as another example. The face name of face 58 is 0,4,3,3,2 or base face index=0, vertex index=4, level=3 and path=3,2. The face name for face 62 is 0,3,3,1,2 or base face index=0, vertex index=3, level=3 and path=1,2.

Because vertices can be shared by two or more faces, it is possible to have the same vertex with more than one name. This is inefficient and does not provide a unique name for that vertex. To resolve this, the vertex is given the number or name from the face name that has the lowest ordering. As noted above, the face names are manipulated in the form of 64 bit integers, to determine which has the lowest ordering, the integers are compared and the smallest has the lowest ordering. In the case set forth in FIG. 8, the vertex 64 would be named based on the ordering of the vertices of face 62, which in the example would be vertex 2.

Because edges can be shared by two faces, it is possible to have the same edge with more than one name. To resolve this, an edge is also given the number or name from the face name that has the lowest ordering.

Figure 9:
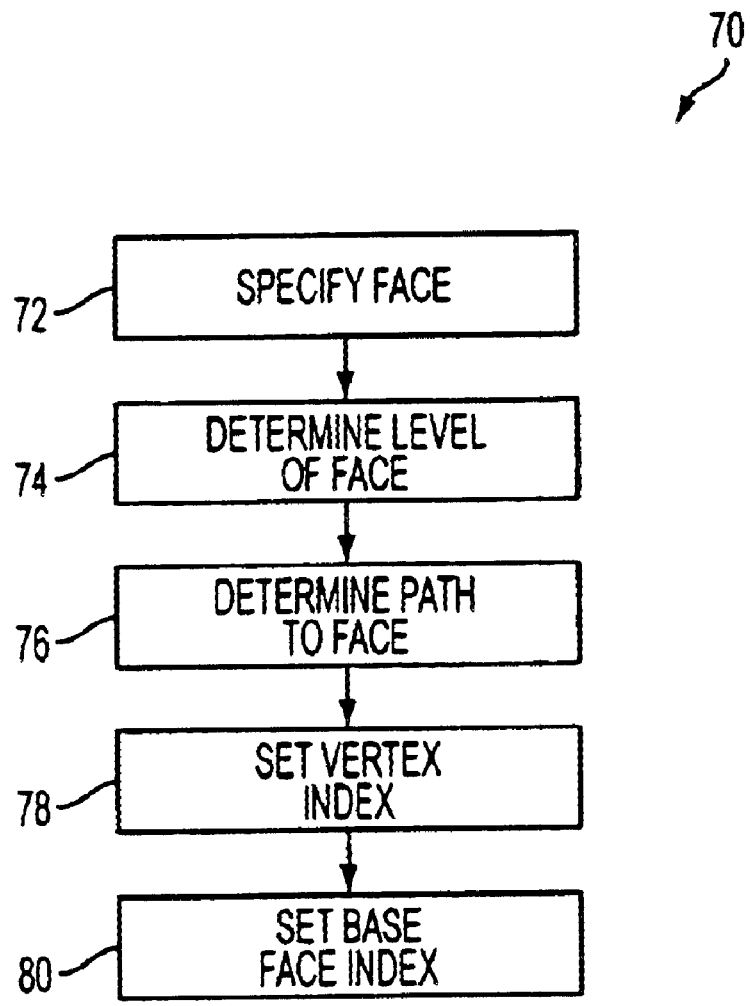
FIG. 9 is a flowchart of a naming operation.

Once a mesh has been subdivided, a routine to produce the face name from a particularly designated face would be performed. This routine 70, as depicted in FIG. 9, would allow the user or the application using the naming routine to specify 72, a face to be named. The system would then determine 74, the level of the face followed by determining 76, the path to the face. Next, the vertex index would set 78, followed by setting 80, the base face index. Below is more detailed pseudo-code for such a routine or program. Note that this routine, when determining the path, starts with the face and works up the quad hierarchy.

Routine to create a face name from a specific face in the subdivision surface hierarchy.

Input: a face

Output: an encoding of that face, made up of:

---

Base_face_index (integer)
Vertex_index (integer)
Level (integer)
Path (stack of integers in the range 0..3, with coarsest at the top of the stack)

---

```
Path = { }                          // path starts out empty
pathFace = face
Level = levelOf ( face )            // routine to return face's level
if( Level == 0)
{
  // face must be a base face
  //
  Base_face_index = indexOf ( face )
  Vertex_index = 0                  // can be anything, actually
}
else
{
  while ( levelOf ( pathFace ) > 1 )
  {
      quadFace = pathFace
      // determine what index this face has, as seen by its parent
face
      //
      pathStep = indexFromParent ( quadFace )
      // stack push: adds step to Path, increasing size of Path
      //
      pushStack ( pathStep, Path)
      pathFace = parentFaceOf ( quadFace )
  }
  // pathFace must be a level-1 face
  //
  Vertex_index = indexFromParent ( pathFace )
  pathFace = parentFaceOf ( pathFace )
  // pathFace must be a level-0 face
  //
  Base_face_index = indexOf ( pathFace )
}
```

Once a face name is available, it is often necessary to access the face identified by the name. A routine to access the face name using the face name would be performed. Below is pseudo-code for such a routine or program.

Routine to access a face based on a name representation.

Input: a face name, consisting of:

Base_face_index (integer)
Vertex_index (integer)
Level (integer)
Path (sequence of integers in the range 0 . . . 3, with coarsest at the top of the stack)

Output: a face in the subdivision surface hierarchy

---

```
base = baseFace (Base_face_index)    // base face with that
index
If Level < 1
  result = base;
else
{
  // start with Level-1 subface of base face at that corner
  //
  result = subFace( base, Vertex_index )
  // iterate as far as Level tells us we have to go
  //
  for(i = 1; i < Level; i++)
```

-continued

```
  {
      // stack pop: removes value at the start of path, shortens path
      quad = popStack ( path )
      //
      result = subFace ( result, quad)    // subFace(f, i) is a routine
                                          // that returns the ith subface
                                          // of face f
  }
}
return result
```

The methods described above can be implemented in special-purpose circuitry, general-purpose circuitry (such as programmable microprocessors) operating under the control of program instructions, or in any combination of such apparatus. However, the methods are not limited to any particular circuitry or program configuration, they can find applicability in any computing or processing environment that can be used for the manipulation of meshes used for constructing surfaces of objects.

Figure 10:
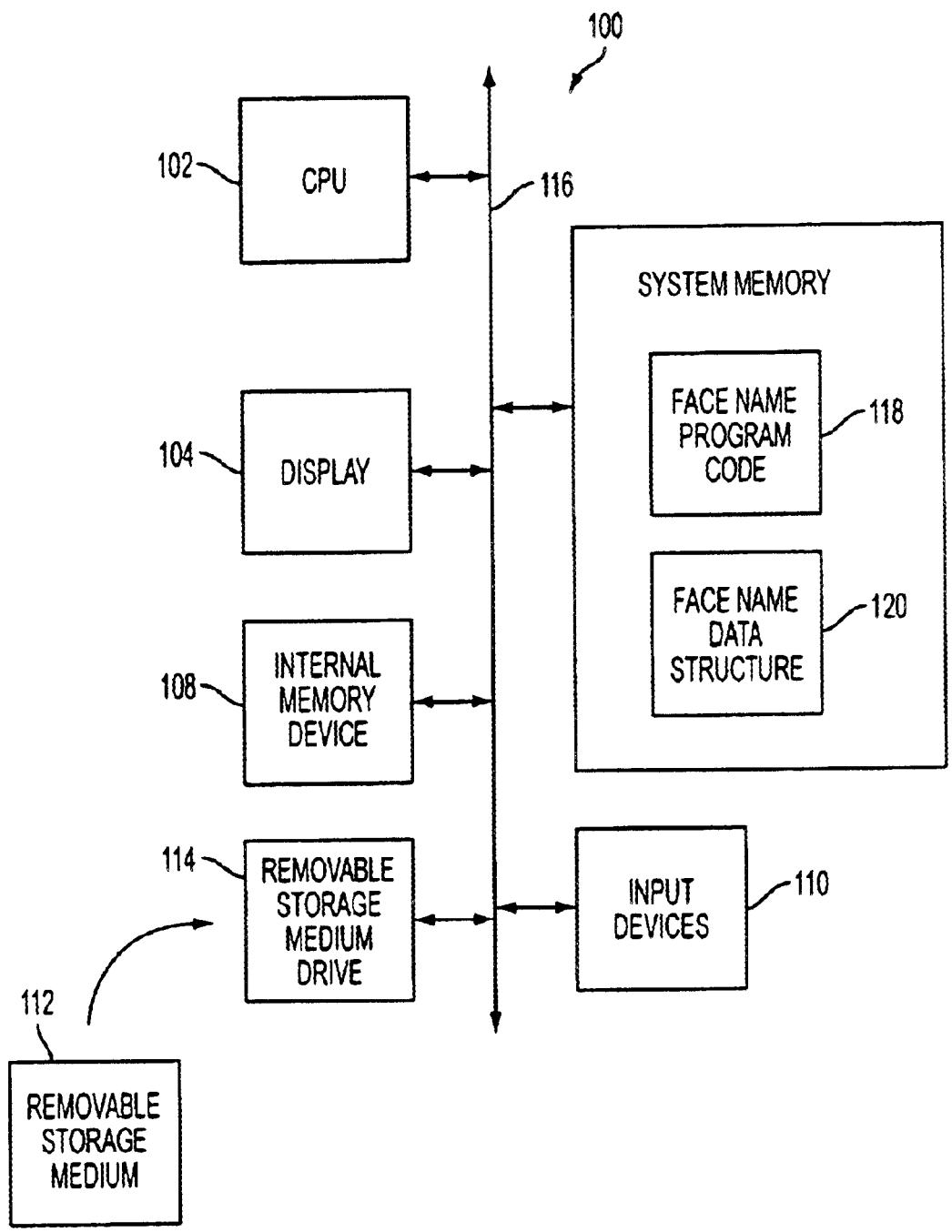
FIG. 10 depicts hardware which can be used in the invention.

As shown in FIG. 10, the invention can be implemented in computer programs executing on programmable circuitry that can include a processor, a storage medium readable by the processor (including volatile or non-volatile memory and/or storage elements), one or more input devices, and one or more output devices. Program code can be applied to data entered using the input device to perform the functions described and to generate the output information. The output information can be applied to the one or more output devices.

A computer system 100 suitable for performing naming operations upon meshes includes a CPU 102, a display 104, a system memory 106, an internal memory device (e.g., hard disk drive) 108, a user input device(s) 110 (e.g., keyboard and mouse), and a removable storage medium 112 (e.g., floppy, tape, or CD-ROM) read by an appropriate drive 114, all coupled by one or more bus lines 116. Code for a program 118 used to create a face name or used to access a face based on the name representation can be stored on removable storage medium 112, and then introduced to computer system 100 through drive 114 to be either temporarily stored in system memory 106 or permanently stored in internal memory device 108. CPU 102 can then use the introduced program 118 to perform operations, including generating and using or generating one or more data structures 120. Program 118 can also be included within another computer graphics program to assist in naming meshes for other operations.

Each program described above can be implemented in a high level procedural or object oriented programming language to communicate with a computer system. However, the programs can be implemented in assembly or machine language, if desired. In any case, the language can be a compiled or interpreted language. Each such program can be stored on a storage medium or device (e.g., DID, CD-ROM, hard disk or magnetic diskette) that is readable by a general or special purpose programmable computer for configuring and operating the computer when the storage medium or device is read by the computer to perform the procedures described in this document. The system can also be considered to be implemented as a computer-readable storage medium, configured with a computer program and/or a data structure, where the storage medium so configured causes a computer to operate in a specific and predefined manner. The program 118 can also be included within another computer graphics program to assist in naming faces or accessing faces of meshes for other operations. The program and/or data structure can also be transmitted over a network such as the Internet.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system, comprising:
    an input source providing a polygonal base mesh having a plurality of arbitrarily sided base faces; and
    a computer analyzing the mesh and determining a linear identifier for any existing base face and a newly created face within an existing base face, the identifier comprising a base face identifier, a vertex index, a level and a path to the face, said computer determines said path by traversing faces within said base face mesh in a predetermined order relative to the vertex index such that the identifier of the newly created face is independent of the order of creation of the faces.

2. A system as recited in claim 1 wherein the identifier is stored as a fixed bit integer.

3. A system as recited in claim 2, wherein said computer disregards leading zeros in the path responsive to the level when accessing the face using the identifier.

4. A system as recited in claim 1, wherein said computer determines a unique vertex name for a vertex of the face.

5. A storage as recited in claim 1, wherein said computer determines a unique edge name for an edge of the face.

6. A system as recited in claim 1, wherein the vertex index identifies a level one subdivision vertex of a zero level subdivision base mesh face corresponding to the face.

7. A system for providing unique names for faces and vertices in an hierarchical subdivision surface from which each face of a surface, each vertex of a surface and each edge of a surface can be unambiguously identified, said system comprising:
    an input source providing a polygonal base mesh having a new face created by a new vertex; and
    a computer analyzing the mesh, determining an identifier for the new face, determining a unique vertex name for the new vertex of the new face, determining a unique edge name for an edge of the new face, with the new face identifier comprising a base face identifier identifying the face surrounding the new vertex, a vertex index and a path to the face, with the vertex index identifying a level one subdivision vertex of a zero level subdivision base mesh face corresponding to the face, with the identifier comprising a level indicator indicating a subdivision level of the face and with the identifier stored as a fixed bit integer.

8. A method of determining a unique identifier for a new face of a mesh in a subdivision surface created by a new vertex, comprising:
    determining a base mesh face surrounding the new vertex;
    determining a vertex index of the new face;
    determining a path to the new face by traversing faces within the mesh in a predetermined order relative to the vertex index;
    determining a level of the new face; and
    combining the base mesh face, the vertex index, the level and the path as the unique identifier such that the identifier of the newly created face is independent of the order of creation of the faces.

9. A method of accessing a new face of a mesh in a subdivision surface created by a new vertex, comprising:
    obtaining a face identifier including a base face index of a face surrounding the new vertex, a vertex index, a level and a path to the face; and
    traversing the path to the face using the base face index, the level and the vertex index by traversing faces within the mesh in a predetermined order relative to the vertex index such that the identifier of the new face is independent of the order of creation of other faces.

10. A method as recited in claim 9, wherein the traversing includes a number of repeated steps which number is responsive to the level.

11. A computer readable storage having a face name data structure providing a face identifier for a subdivision surface face and controlling access for the face by a computer using the face name data structure relative to a vertex with the face identifier comprising a base face identifier field storing a base face surrounding the vertex, a vertex index field storing a vertex index, a level field storing a level of the surface face and a path field storing a path to the surface face traversing faces within the subdivision surface in a predetermined order relative to the vertex index such that the identifier of the surface face is independent of the order of creation of other faces.

12. A storage as recited in claim 11, further comprising a unique vertex name for a vertex of the face.

13. A storage as recited in claim 11, further comprising a unique edge name for an edge of the face.

14. An apparatus for analyzing a mesh having plural faces each having an arbitrary number of sides, a new vertex and new faces corresponding to the new vertex, the apparatus comprising a computer analyzing the mesh and determining a unique identifier for a first face of the new faces comprising a base face identifier identifying the face surrounding the new vertex, a vertex index on the new first face, a level of the new first face and a path to the new first face determined by traversing faces within the mesh in a predetermined order relative to the vertex index such that the identifier of the first face is independent of the order of creation of the faces.

15. A system, comprising:
    an input source providing a polygonal base mesh having a plurality of arbitrarily sided base faces; and
    a computer analyzing the mesh and determining a linear identifier for any existing base face and a newly created face within an existing base face, the identifier comprising a base face identifier, a vertex index, a level and a path to the face, and where said computer determines the identifier of the newly created face independent of the order of creation of the faces and such that each face is uniquely identified without reference to other identifiers.

* * * * *

UNITED STATES PATENT AND TRADEMARK OFFICE
CERTIFICATE OF CORRECTION

PATENT NO. : 6,850,638 B1 Page 1 of 1
APPLICATION NO. : 09/515517
DATED : February 1, 2005
INVENTOR(S) : Michael Lounsbery It is certified that error appears in the above-identified patent and that said Letters Patent is hereby corrected as shown below:

Column 1, line 7, change "09/16,553" to --09/116,553--
Column 2, line 29, change "subdivisions" to --subdivisions--;
        line 54, change "preferable" (both instances) to --preferably-- (both distances);
        line 55, change "preferable" to --preferably--; and
        line 59, after "with" insert --the--.
Column 3, line 6, after "above" delete ","; and
        line 11, after "depends of" to --depends on--.
Column 6, line 5, move "//" from under "quad" to above "quad".

Signed and Sealed this

Thirtieth Day of October, 2007

JON W. DUDAS
*Director of the United States Patent and Trademark Office*